No. 882,349. PATENTED MAR. 17, 1908.
C. F. SCHMIDT.
POTATO PLANTER.
APPLICATION FILED DEC. 21, 1907.

2 SHEETS—SHEET 1.

WITNESSES
Chas. K. Davis
Myron H. Clear

INVENTOR
Charles F. Schmidt
By C. L. Parker, Attorney

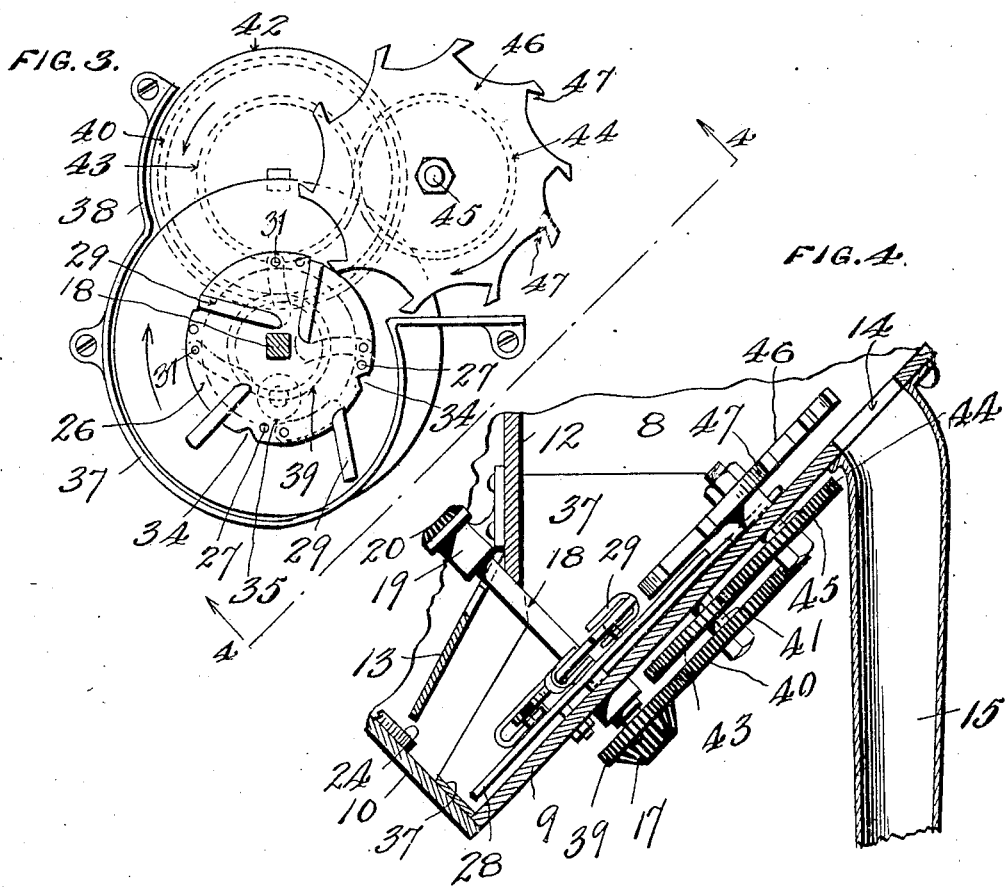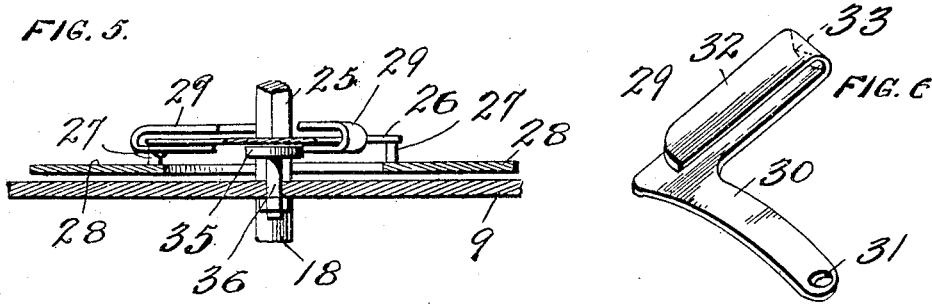

UNITED STATES PATENT OFFICE.

CHARLES F. SCHMIDT, OF JEFFERSONTOWN, KENTUCKY.

POTATO-PLANTER.

No. 882,349.     Specification of Letters Patent.     Patented March 17, 1908.

Application filed December 21, 1907. Serial No. 407,543.

*To all whom it may concern:*

Be it known that I, CHARLES F. SCHMIDT, a citizen of the United States, residing at Jeffersontown, in the county of Jefferson and State of Kentucky, have invented certain new and useful Improvements in Potato-Planters, of which the following is a specification.

My invention relates to potato planters and the object thereof is to provide a novel and useful construction which will require only one operator and which will be simple and highly efficient in use.

A further object of my invention is to produce a potato feeding apparatus wherein means are provided to prevent a superfluous feeding.

A further object of my invention is to provide a potato feeding mechanism which will feed potatoes without sticking or otherwise injuring the same.

Figure 1:
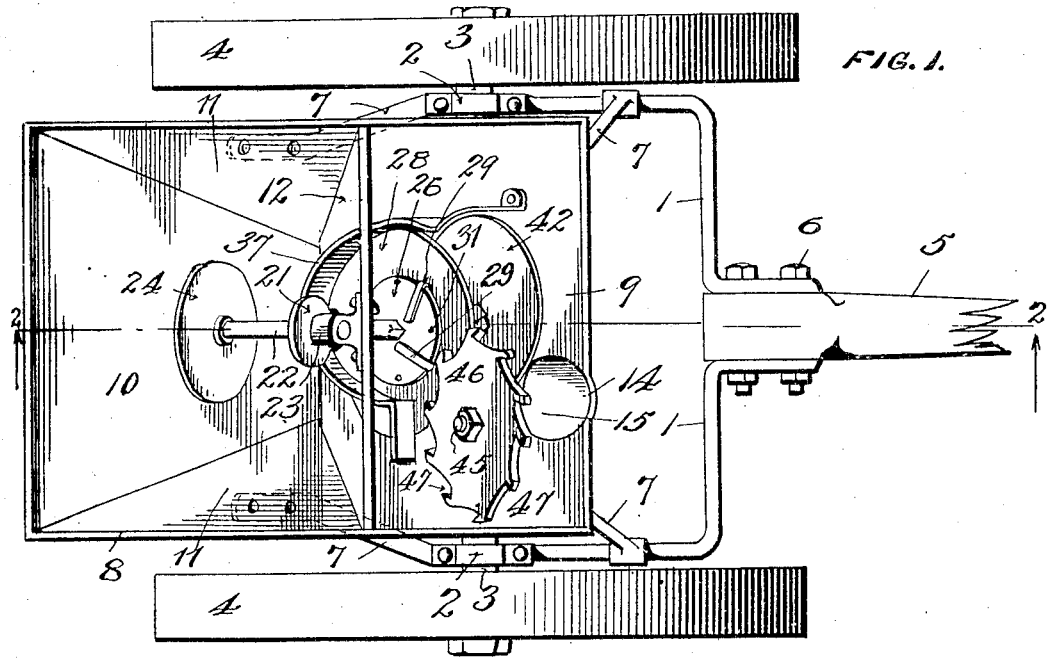
Figure 2:
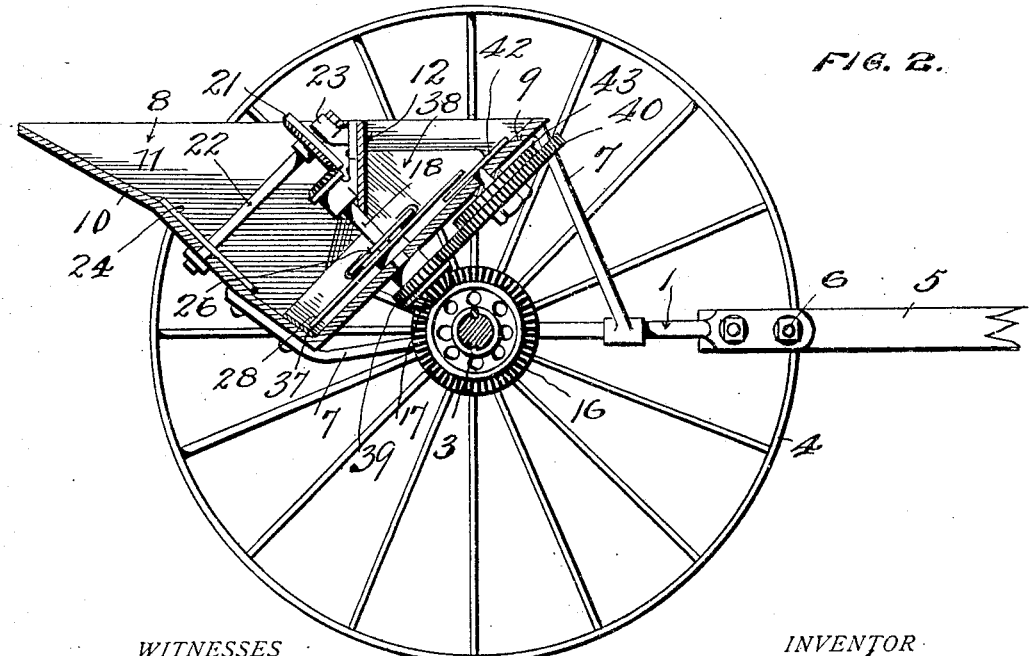

Further objects and advantages of my invention will be apparent from the following description, in which reference is made to the accompanying drawings forming a part thereof, in which like numerals are used to designate like parts throughout the several figures, and in which Figure 1 is a top plan view of a potato planter constructed in accordance with my invention. Fig. 2 is a central vertical sectional view taken therethrough on the line 2—2 of Fig. 1 looking in the direction of the arrows, Fig. 3 is a detail plan view on an enlarged scale of the feeding mechanism, Fig. 4 is a fragmentary sectional view, in detail, on the line 4—4 of Fig. 3 looking in the direction of the arrows, Fig. 5 is a detail sectional view, broken away and on an enlarged scale, of parts to be hereinafter specifically referred to, and Fig. 6 is a perspective view of one of the feed plate fingers detached.

In the practical embodiment of my invention I provide a U-shaped frame 1 carrying alined journals 2 at the extremity of its extensions, through which journals an axle or shaft 3 is mounted having wheels keyed thereon. The frame 1 is connected at its central point to a forwardly extending tongue 5 by bolts 6. Mounted slightly in the rear of the axle 3 and held by brackets or the like 7 projecting from the frame 1 and its journals 2, is a hopper 8 having forwardly and rearwardly inclined sides 9 and 10 respectively, said sides meeting at a central point and forming the base of the hopper. The rearward inclined side 10 is provided with inclined ends 11, thus forming a relatively narrow base above which is mounted a stationary partition plate 12, having a feed gate 13 which may be of the ordinary adjustable type, extending between the base of the same and angularly therefrom, to the inclined side 10 adjacent its base. The potatoes to be planted are thrown into the the hopper 8 rolling down its rear inclined side 10 and being fed upwardly, by my improved mechanism, along the inclined forward face 9 to and through an opening 14 leading to the feed tube 15 guiding the falling potatoes to the desired row approximately centrally between the wheels 4 of the frame.

Keyed upon the shaft 3 is a large bevel gear 16, meshing with and rotating a small bevel gear 17 secured upon the end of a shaft 18 projecting through the forward inclined side 9 of the hopper and extending substantially parallel with the plane of the rear inclined side 10 thereof. The shaft 18 is mounted through a bracket 19 secured upon the stationary partition 12 and is provided upon its inner end beyond said bracket with a small bevel gear 20. The gear 20 meshes with and rotates a large bevel gear 21 secured upon a shaft 22 mounted through a bracket 23 on the partition 12 and through the rear inclined side 10 of the hopper at right angles to said shaft 18, said shaft 22 being provided with a smooth stirring wheel 24 secured thereon adjacent the inner face of the inclined side 10 and slowly rotating to prevent the potatoes clogging beneath the feed gate 13 without bruising or injuring them. The shaft 18 is provided with a squared portion 25 immediately within the hopper, said squared portion projecting through a feed plate 26 connected by pins 27 to an annular plate 28 extending circularly outside of said feed plate. The feed plate 26 is provided with a plurality of feed fingers 29 pivotally mounted upon the under face thereof and shown particularly in Fig. 6. The fingers 29 are preferably formed of sheet metal and comprise an L-shaped body 30 pivoted at 31 at the end of one of its extensions upon the under face of the feed plate 26 and provided upon its other extension with a portion 32 thereof bent back thereon and spaced therefrom, the material at the point of bending of said member 32 and upon the inside of such bend being formed with a V-shaped reinforcing plug 33 adapted to enter similarly shaped slots 34 in the periphery of the feed plate 26, when said fingers 29 are swung inwardly thereagainst. Thus, upon its upward movement each of the fingers 29 swings inwardly as specifically shown in Fig. 3, and enters its recess 34, thus lying with its material flush with the periphery of said feed plate and being swung outwardly on the downward movement of the same by contact with a roller 35 rotatably mounted upon the upper end of a stationary pin 36 secured through the inclined side 9 slightly below the shaft 18. An upstanding shield 37 surrounds the lower portion of the feed plate 26 and is provided with a portion 38 extending upwardly beyond the same upon its feed side, said shield being spaced from said feed plate and between which the potatoes are forced upwardly in a mass by the swinging fingers 29 when the same are swung outwardly by the roller 35.

The shaft 18 is provided adjacent its bevel gear 17 outside of the hopper 8 with a small pinion 39 meshing with and rotating a large pinion 40 carried upon a stud shaft 41 mounted through the inclined side 9 of the hopper and provided with a singling plate 42 secured thereon within the hopper 8 below the annular plate 28 of the feed plate 26. The singling plate 42 is thus rotated in the reverse direction to the rotation of the feed plate 26 and is provided upon its stud shaft 41 outside of the hopper 8 with a medium sized pinion 43 meshing with a smaller sized pinion 44 secured upon a second stud shaft 45 mounted through the inclined side 9 above the feed plate 26 and at one side of the singling plate 42. The stud shaft 45 carries the dropping feed plate 46 secured thereon overlying, in its rotation, both the annular plate 28 of the feed plate 26 and the singling plate 42. The periphery of the dropping feed plate 46, in the rotation of the same, passes across the opening 14 to the feed guide 15, and is provided with a plurality of similarly constructed pockets or recesses 47 cut on a tangent in a circular edge thereof.

The shaft 18 being rotated through gears 16 and 17 causes the rotation of the feed plate 26 which by means of the fingers 29 forces the potatoes upwardly between said feed plate and said shield 37 upon the annular plate 28. The rotating shaft 18 revolves the singling plate 42 slowly in the reverse direction through the pinions 39 and 40, and said singling plate and its stud shaft rotate the dropping plate 46 through the pinions 43 and 44 of substantially the same size. The dropping plate 46 is thus rotated in the same direction as the feed plate 26 and its tangential recesses 47 are formed in such manner as to receive and hold a potato therein and at the base of said recesses, notwithstanding the effect of the reversely rotating singling plate 42 which plate serves to withdraw and return such potatoes as are loose within the pockets in the event that the same receive more than one potato. The dropping plate 46 in its rotation drops the potatoes successively through the opening 14 and through the feed guide 15.

From the foregoing description and by careful reference to the accompanying drawings, it will be readily seen that I provide a novel and efficient construction of potato planter which will positively feed the potatoes one at a time to the feed guide and without sticking, bruising or injuring the same.

Having thus described my invention, I claim:

1. In a potato planter of the character described, the combination of a frame, a hopper carried thereby having an inclined side provided with a feed opening adjacent its upper end, means for feeding the potatoes up said inclined side, and means for withdrawing the superfluous potatoes from said feeding means, substantially as described.

2. In a potato planter of the character described, the combination of a frame, a hopper carried thereby having an inclined side provided with a feed opening adjacent its upper end, a feeding mechanism for feeding the potatoes upwardly upon said inclined side and dropping the same through said feed opening and a singling member operated from said mechanism for withdrawing the superfluous potatoes therefrom, substantially as described.

3. In a potato planter of the character described, the combination of a wheeled frame, a hopper carried thereby having an inclined side provided with a feed opening adjacent its upper end, means for feeding the potatoes up said inclined side operated from said wheeled frame, and means for withdrawing the superfluous potatoes from said feeding means, substantially as described.

4. In a potato planter of the character described, the combination of a wheeled frame, a hopper carried thereby having an inclined side provided with a feed opening adjacent its upper end, a feeding mechanism for feeding the potatoes upwardly upon said inclined side and dropping the same through said feed opening, and a singling member operated from said mechanism for withdrawing the superfluous potatoes therefrom, substantially as described.

5. In a planter of the character described, the combination with a hopper having an inclined side provided with a feed opening adjacent its upper end, of a rotatable feed plate having fingers projecting therefrom, a plate mounted beneath said fingers and rotating with said feed plate, a shield surrounding said last named plate and between which and said feed plate the potatoes are fed upwardly upon said inclined side, a dropping plate to receive the potatoes and convey the same to said feed opening, and a singling plate for withdrawing the superfluous potatoes from said dropping plate, substantially as described.

6. In a planter of the character described, an inclined feed plate having a plurality of substantially L-shaped fingers pivotally secured thereto and adapted to swing inwardly thereagainst, and a member suitably arranged to swing said fingers outwardly from said plate to engage and feed the potatoes, substantially as described.

7. In a planter of the character described, a rotatable feed plate provided with notches in its peripheral edge, a plurality of substantially L-shaped fingers pivotally secured at one end to said feed plate and adapted to swing inwardly and engage within said notches to lie flush with the peripheral edge of said feed plate, a member suitably arranged to engage and swing said fingers outwardly to the feeding position, and a dropping plate to receive the potatoes from said feed plate, substantially as described.

8. In a planter of the character described, a dropping plate having a plurality of recesses in its peripheral edge cut therein on a tangent, and a singling plate mounted adjacent said dropping plate to engage the potatoes carried thereby, said singling plate being rotated in an opposite direction to the rotation of said dropping plate to withdraw the superfluous potatoes therefrom, substantially as described.

In testimony whereof I affix my signature in presence of two witnesses.

CHARLES F. SCHMIDT.

Witnesses:
SIGMOND J. BLOCK,
C. L. PARKER.